United States Patent [19]

Nash et al.

[11] Patent Number: 5,363,253
[45] Date of Patent: Nov. 8, 1994

[54] TAPE DRIVE FAST SEEK TO END-OF-TRACK

[75] Inventors: Mark E. Nash, Lyons; John K. Moore; Kevin L. Miller, both of Loveland, all of Colo.

[73] Assignee: Hewlett-Packard Company, Palo Alto, Calif.

[21] Appl. No.: 23,258

[22] Filed: Feb. 25, 1993

[51] Int. Cl.⁵ .............................................. G11B 15/18
[52] U.S. Cl. .................................. 360/69; 360/73.06; 360/78.02; 395/725
[58] Field of Search ................. 360/72.1, 72.2, 73.01, 360/73.04, 73.05, 73.06, 73.07, 74.1, 74.4, 74.5, 74.6, 69, 71, 75; 364/238.3, 240.9; 395/275, 725

[56] References Cited

U.S. PATENT DOCUMENTS

| | | | |
|---|---|---|---|
| 4,365,278 | 12/1982 | Takizawa et al. | 360/72.1 X |
| 4,847,708 | 7/1989 | Furuyama | 360/72.1 X |
| 4,858,039 | 8/1989 | Mintzlaff | 360/72.2 |
| 5,210,661 | 5/1993 | Woo | 360/72.1 X |

Primary Examiner—Aristotelis Psitos
Assistant Examiner—James L. Habermehl
Attorney, Agent, or Firm—Augustus W. Winfield

[57] ABSTRACT

A tape drive control system with improved overall dam transfer rate. A streaming tape drive system for a multi-track serpentine data tape is controlled by a host computer. The data tape has a fixed number of data sectors per track. The host computer monitors tape position by observing data sector identification. The drive sends a ready/not-ready status signal to the host. The drive has a default mode. In the default mode, the drive generates an error signal if the host sends motor speed commands or head movement commands when the drive is sending a not-ready status. The host computer software can command the drive to enter a special mode. In the special mode, the drive does not generate an error if the host sends motor speed commands or head movement commands when the drive is sending a not-ready status. After placing the drive in the special mode, when the end of data for a track is reached, the host computer ignores the drive status signal and commands the tape drive to immediately set its motor to the maximum speed and to immediately move the head to the next track.

5 Claims, 4 Drawing Sheets

TAPE DRIVE FAST SEEK TO END-OF-TRACK

FIELD OF INVENTION

The present invention relates generally to data storage tape devices and more particularly to overall data transfer rate improvement in streaming devices employing serpentine track geometry.

BACKGROUND OF THE INVENTION

Data storage tapes are often used for backup of other mass memory devices such as disk drives. In backup or restore operations, tape drives typically operate in a streaming mode, continuously recording or reading sequential data as opposed to operating in a start-stop mode with random access to data. Tapes for data storage are often formatted into multiple data tracks running linearly down the length of a tape. The drives using such tapes typically have one or more fixed data transfer rates. The tape speed typically has some acceptable variation due to motor speed and other drive mechanical tolerance. A fixed data transfer rate with variable tape speed results in a variation in the physical length of tape required to store a fixed amount of data.

FIG. 1 illustrates a simplified example using track conventions as specified by one of the Quarter-Inch Cartridge (QIC) Drive Standards. For simplicity, FIG. 1 illustrates a tape 100 with five tracks. Data starts at either end of the tape at a logical boundary (102, 104) defined by the edge of an end-of-tape marker hole (106, 108). Actual QIC tapes may have as many as 44 tracks. As illustrated in FIG. 1, track number 0 (110) is in the center of the tape. During formatting, data is first written at the logical beginning (102) of track number 0 (110) and proceeds in the direction of the arrow 112. In the QIC standard, each track has a fixed amount of data. The end of data for track 0 is illustrated by position 114. If a drive speed is relatively slow during formatting, then a relatively small amount of tape will pass over a head before one track of data is exhausted. Therefore, there will be an unused section of tape between the end of data 114 and the logical end of the track 104. In addition, even with an exact drive speed, there is a certain amount of acceptable variation in tape length which may also result in an unused section of tape. Tape between the end of data at position 114 and the end-of-track 104 is DC erased by the tape head during formatting. This is illustrated by cross-hatched areas in FIG. 1.

QIC standards (and other data tape standards) specify a serpentine track arrangement which optimizes streaming operations. As illustrated in FIG. 1, after the tape 100 has traversed the length of track number 0, the head is stepped to track number 1 and formatting proceeds in the reverse direction, starting from the logical end-of-tape 104. As illustrated, formatting then proceeds to track number 2 in the same direction as track number 0 and so forth.

As an example, consider a drive and tape compatible with the QIC-80 standard. Tapes compatible with this standard are formatted into 28 tracks. There are several alternative standard tape lengths, the longest being 1,100 feet. The specified maximum long term speed variation for the linear speed of the tape media across the recording head is $+/-3.0\%$. A drive with a maximum specified linear speed will use essentially all of a 1,100 foot tape length to format a track. A drive with a minimum specified linear speed will format a track with 6% less active length (1,034 feet). The tape resulting from the minimum speed drive will have a 66 foot erased section of tape at one end of each track. For 28 tracks, a worst case total of 1,848 linear feet of erased tape must pass over the head. At one of the standard tape speeds of 34 inches/second, a backup using the entire tape would spend about 11 minutes of backup time in erased areas of the tape.

There is a need to improve overall data transfer times by minimizing the time spent in the erased areas of a tape. However, prior art drives have been constrained by limitations of the QIC standards. The QIC standards specify a "Ready" signal from the drive to the host indicating that the drive is ready to receive commands. This "Ready" signal is permitted only when both the tape and head are stationary. There is a need to minimize time spent in erased areas without waiting for a "Ready" signal.

This patent specification uses QIC standards as representative examples for application of the present invention. Of particular interest are QIC-80, Revision I, Sep. 2, 1992 (recording format) and QIC-117, Revision C, Jun. 2, 1992 (command set and interface). These standard documents are available from Quarter-Inch Cartridge Drive Standards, Inc., 311 East Carrillo Street, Santa Barbara, Calif. 93101.

SUMMARY OF THE INVENTION

In the present invention, the host can command the tape drive to enter into a special mode. In the special mode, the drive does not generate an error if motor speed commands or head movement commands are received while the drive is sending a not-ready status signal. In the present invention, driver software in the host computer monitors tape position by tracking data sector numbers. By knowing tape position, the host knows when the heads are over an erased portion of the tape. Therefore, the host computer can safely issue motor control commands and head control commands in the erased areas, even though the drive is indicating that it is not ready to receive commands. When the end of data for a track is reached, and the drive is in the special mode, the host computer driver software commands the tape drive motor to immediately accelerate to a high-speed mode. In addition, except during formatting operations, when the end of data for a track is reached, the host computer driver commands the tape drive to immediately initiate head movement to the next track. During formatting operations, the head remains on one track after the end of data in order to erase the subsequent erased area.

DETAILED DESCRIPTION OF THE PREFERRED EMBODIMENT OF THE INVENTION

Figure 1:
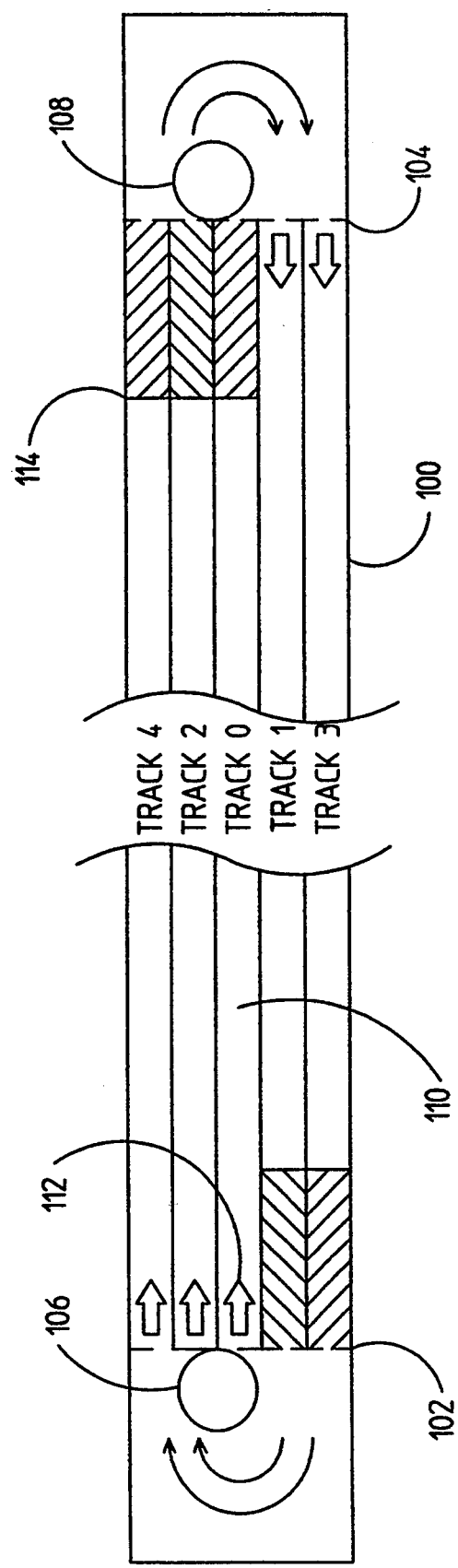
FIG. 1 (prior art) is a simplified top view of a data storage tape illustrating a typical serpentine track layout.
Figure 2:
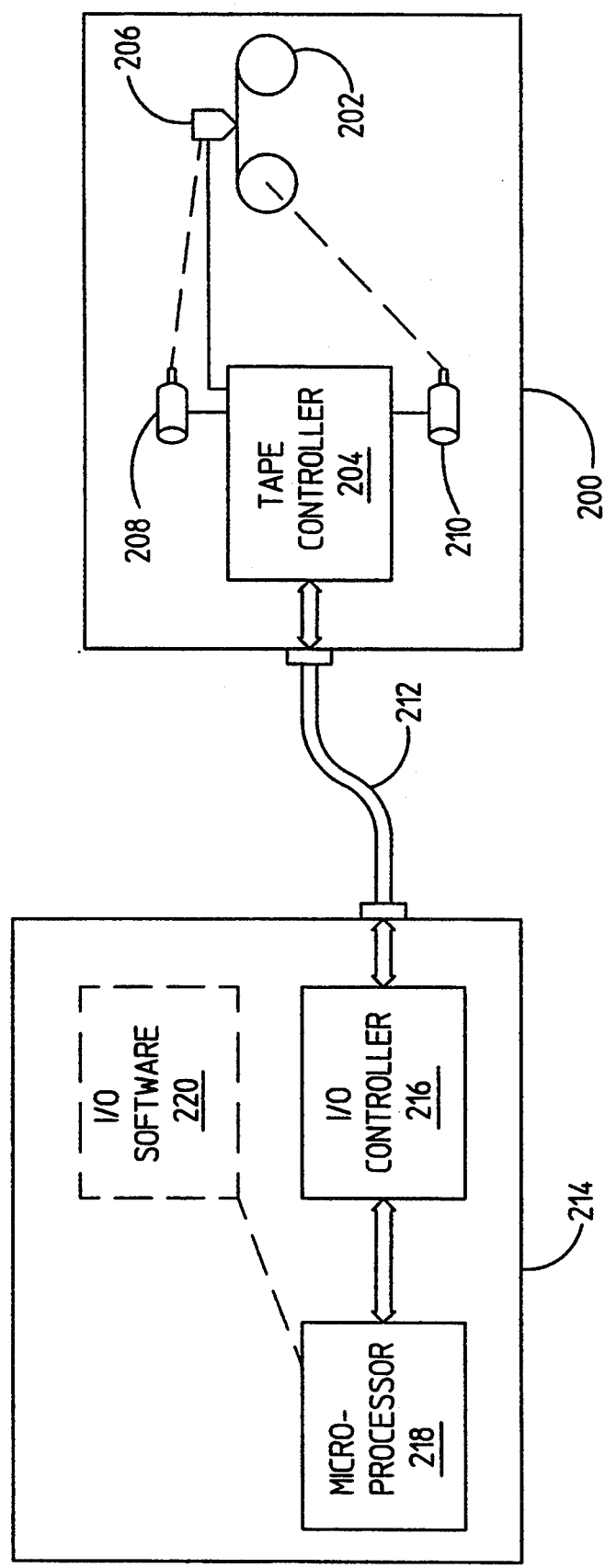
FIG. 2 is a block diagram illustrating the overall system incorporating the present invention.

FIG. 2 illustrates the overall system incorporating the present invention. In FIG. 2, a tape drive 200 contains a tape 202 controlled by a controller 204. Controller 204 reads and writes data to the tape 202 through a magnetic head 206, positions the head 206 by an actuator 208, and controls tape movement through a motor 210. In addition, the controller 204 can sense beginning-of-tape and end-of-tape markers (for example, FIG. 1, 106 and 108) via an optical marker sensor (not illustrated). The tape drive 200 is connected via an I/O cable 212 to a computer 214. The computer contains an input/output (I/O) controller 216 which in turn is controlled by a microprocessor 218 which has I/O software 220 specific to the tape drive 200. The tape drive 200 may be physically built into the computer 214 or it may be a physically separate peripheral device.

Figure 3:
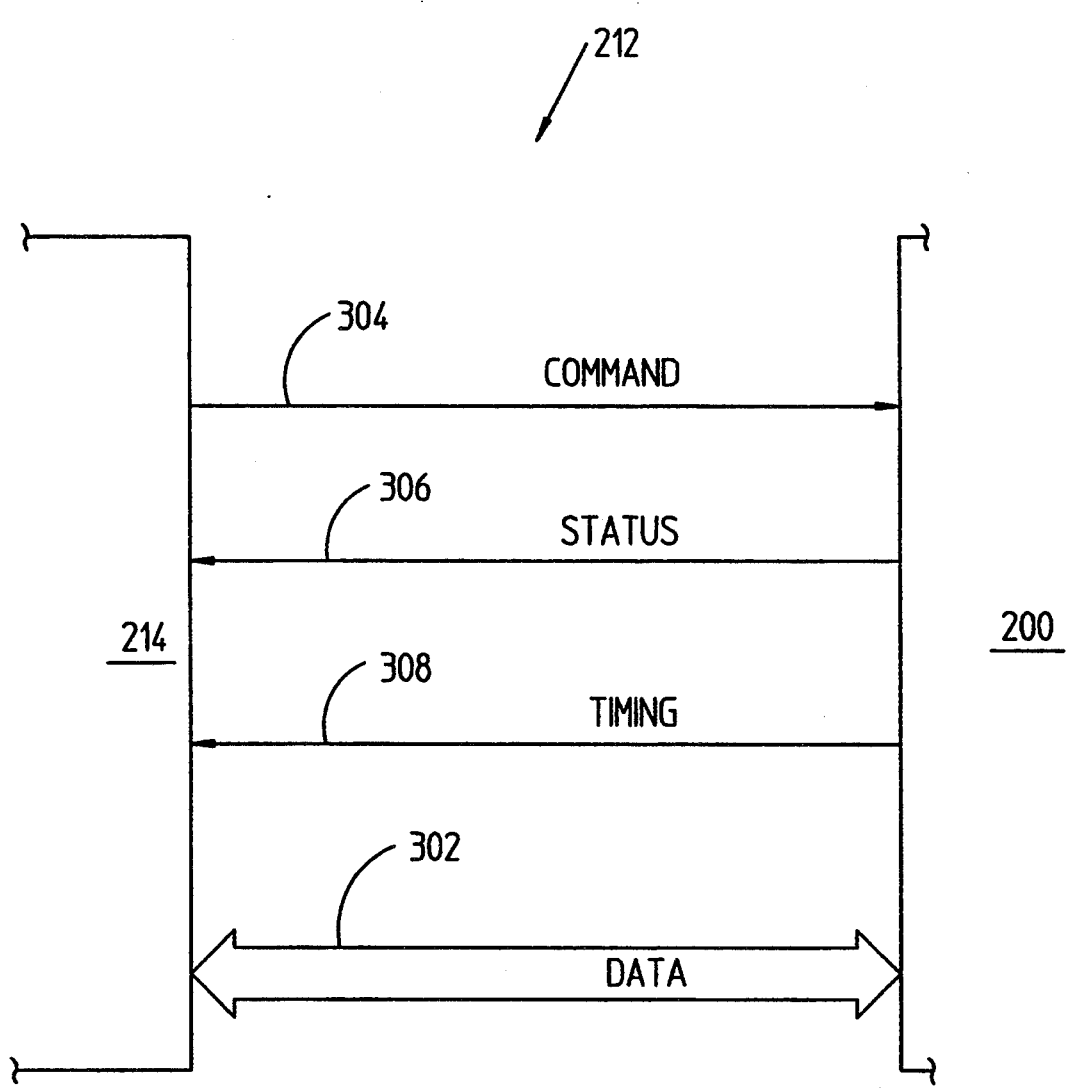
FIG. 3 is a schematic diagram illustrating additional signal line detail for a cable illustrated in FIG. 2.
Figure 4:
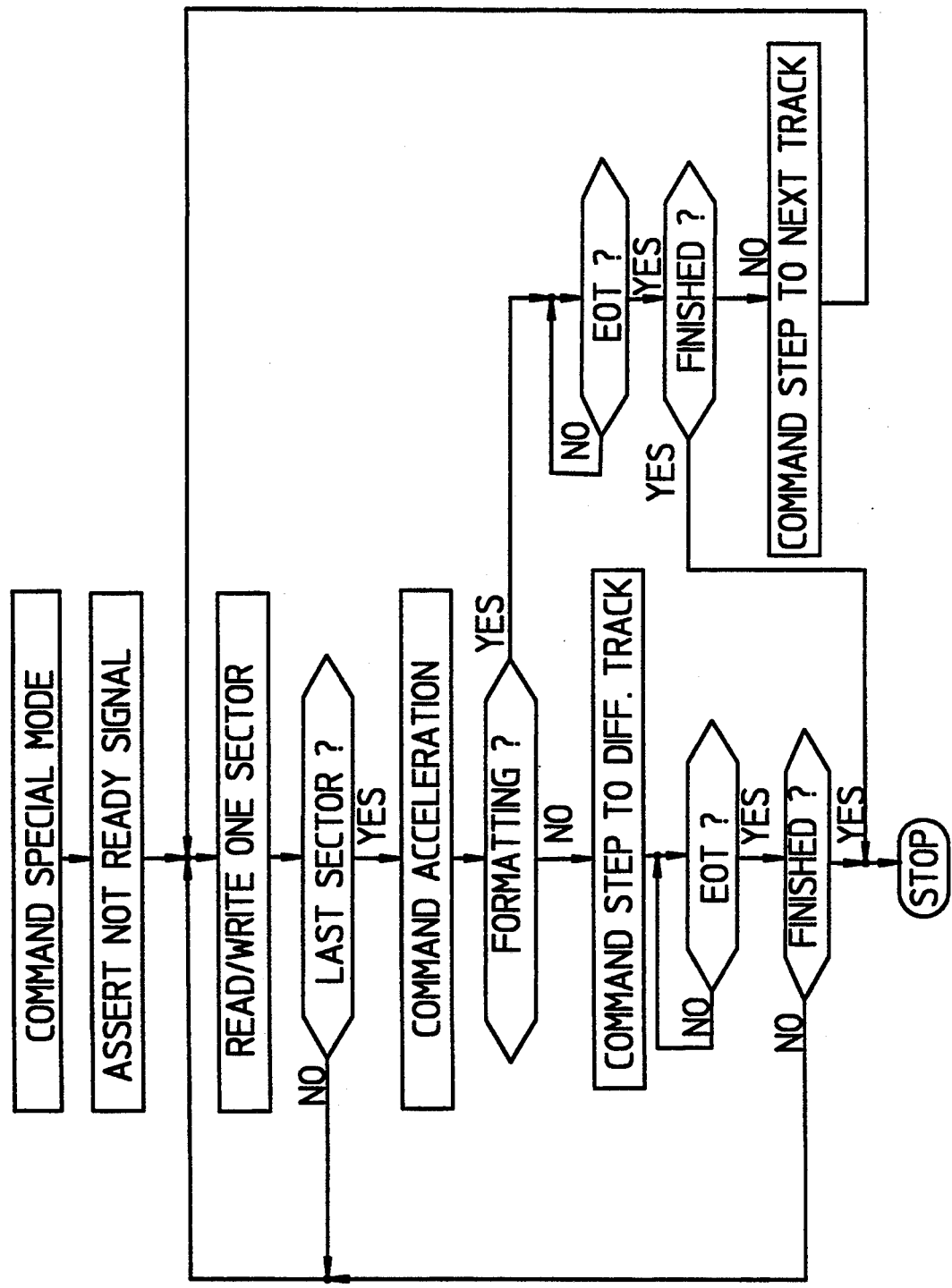
FIG. 4 is a flow chart illustrating the method of the invention.

FIG. 3 illustrates additional detail for information flow over the I/O cable 212. In addition to data 302 being read or recorded, the host computer 214 can send various commands 304 to the tape drive 200. The tape drive 200 can respond with various status information 306. In addition, the tape drive 200 provides various timing information 308.

Four particular commands 304 from the host computer 214 to the tape drive 200 are as follows:
1. Logical Forward (read/write speed in the direction of reading and writing)
2. Physical Reverse (highest available speed toward physical beginning-of-tape (toward 102 in FIG. 1)).
3. Physical Forward (highest available speed toward physical end-of-tape (toward 104 in FIG. 1)).
4. Seek Head to Track (position the head over a specified track)

One particular status state 306 from the tape drive 200 to the host computer 214 is "Ready", which indicates that the drive is not executing a command or in motion. In the particular case of QIC compatible drives, the "Ready" signal is false (indicating not ready) as long as either the tape or head is in motion. The QIC-117 specification requires that if tape or head motion commands are received when the "Ready" signal is false, then the drive should suppress the commands and generate an error. This is reasonable because, in general, tape motion commands such as "Physical Forward" when the "Ready" signal is false could cause a loss of data.

The QIC-117 standard also specifies commands from the host computer to the tape drive which cause the drive to enter a special mode. In particular, command codes 28 and 29 are used to command the drive to enter a "diagnostic mode." The mode resulting from one of these commands is manufacturer dependent. Although labeled "diagnostic mode," it is not necessary for the mode to actually be a diagnostic mode. In the present invention, one of the two diagnostic modes is implemented in a way which permits the tape drive to accept and execute tape and head motion commands even if the "Ready" signal is false. If the drive is in the special mode and tape motion and head motion commands are received while the "Ready" signal is false, then no error is generated. Therefore, the drive default mode is a QIC compatible mode but the drive can be commanded by host software to enter a manufacturer specific mode for use with compatible host software.

In the present invention, tracks are divided into segments. The number of segments per track depends on the length of the tape. A header segment is created during formatting which includes the number of tape segments per track. In addition, segments are divided into 32 sectors, each sector comprising 1024 consecutive bytes transferred as a unit. Each sector contains a unique physical identification number.

In the present invention, the host computer (FIG. 2, 214) reads the header segment from the tape (FIG. 2, 202). Since the number of sectors per segment is fixed, this also determines the number of sectors per track. During a read or write operation, the host computer I/O software (FIG. 2, 220) keeps track of sector identification as sectors are written or read. In addition, the host computer I/O software keeps track of the direction of tape movement (determined by even or odd track number as illustrated in FIG. 1). After the last sector on a track has been written or read, the host computer sends a "Physical Forward" command (FIG. 3, 304) if on an even numbered track or a "Physical Reverse" command if on an odd numbered track. This immediately places the drive in the highest available speed in the direction of reading or writing.

During formatting, the head (FIG. 1, 206) is used to DC erase the area beyond the data portion of a track. Therefore, in the present invention, during formatting the head erases in a high speed mode after the last sector on each track. In the present invention, after the last sector on a track has been written or read during a read or write operation, the host computer sends a "Seek Head to Track" command (FIG. 3, 304) which initiates immediate head movement to the next track.

When the tape reaches a marker hole (FIG. 1, 106, 108), the drive controller (FIG. 2, 204) automatically decelerates and stops the tape. When the tape is stopped and head movement is complete, the drive controller sets the status (FIG. 3, 306) to "Ready". If appropriate, the host computer then issues a "Logical Forward" command (FIG. 3, 304) to continue reading or writing at the logical beginning of the next track (FIG. 1, 102 or 104).

By monitoring tape position through sector identification, the host computer is able to ignore the drive "Ready" signal and command the drive to move the tape and head immediately after the last sector of each track. As a result, the time spent in unused areas of the tape is reduced and the overall data transfer rate is increased.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:
1. A tape drive system comprising:
   a tape drive mechanism;
   a drive controller adapted to control the tape drive mechanism, adapted to receive commands from a host computer and adapted to send a not-ready signal to the host computer;
   the drive controller normally refusing to accept the commands from the host computer if the drive controller is asserting the not-ready signal; and the drive controller having a special mode enabling the drive controller to accept the commands from the host computer even when the drive controller is asserting the not-ready signal.

2. The tape drive system of claim 1 further comprising: the drive controller receiving and accepting an acceleration command from the host computer while the drive controller is in the special mode and while the drive controller is asserting the not-ready signal.

3. The tape drive system of claim 2 further comprising: the special mode in the drive controller resulting from a mode command received from the host computer.

4. A method of increasing overall data transfer rate in a tape drive system, the method comprising the following steps:

(a) receiving a mode command, by the tape drive system, from a host computer;

(b) entering a special mode, by the rope drive system;

(c) asserting, by the tape drive system, a not-ready signal;

(d) receiving, by the tape drive system, an acceleration command from the host computer;

(e) accepting the acceleration command, even though the not-ready signal is asserted, as a result of being in the special mode;

(f) accelerating immediately to a highest speed.

5. The method of claim 4 further comprising the following steps:

(g) receiving, by the tape drive system, a step command from the host computer;

(h) accepting the step command, even though the not-ready signal is asserted, as a result of being in the special mode;

(i) stepping immediately to a next track if the tape drive system is not formatting a tape.

* * * * *